Nov. 9, 1954　　　　H. V. TUTTON　　　　2,693,839
VEHICLE WHEEL TRACTION DEVICE
Filed Nov. 19, 1948　　　　　　　　　　3 Sheets-Sheet 1
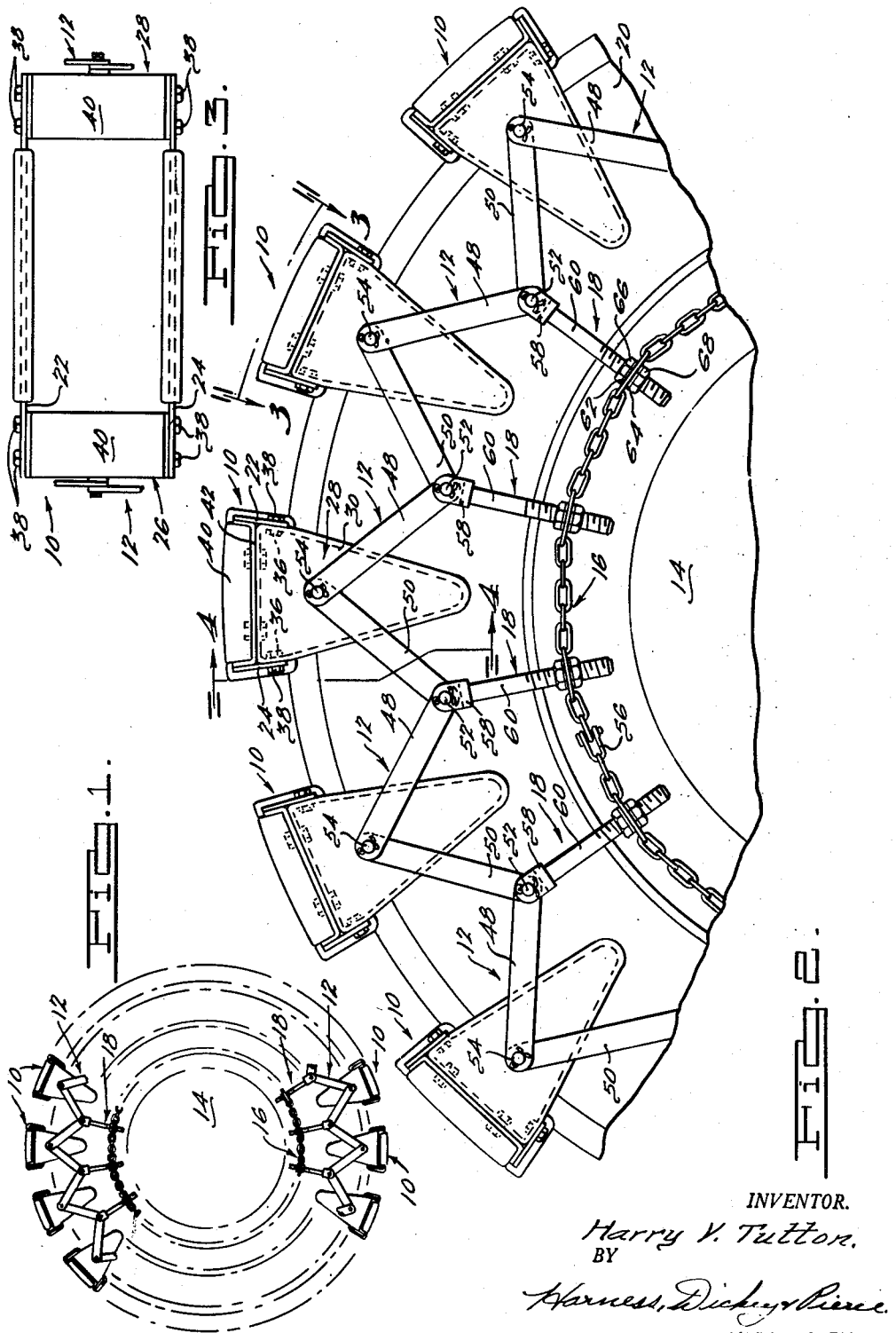
INVENTOR.
Harry V. Tutton.
BY
Harness, Dickey & Pierce.
ATTORNEYS.

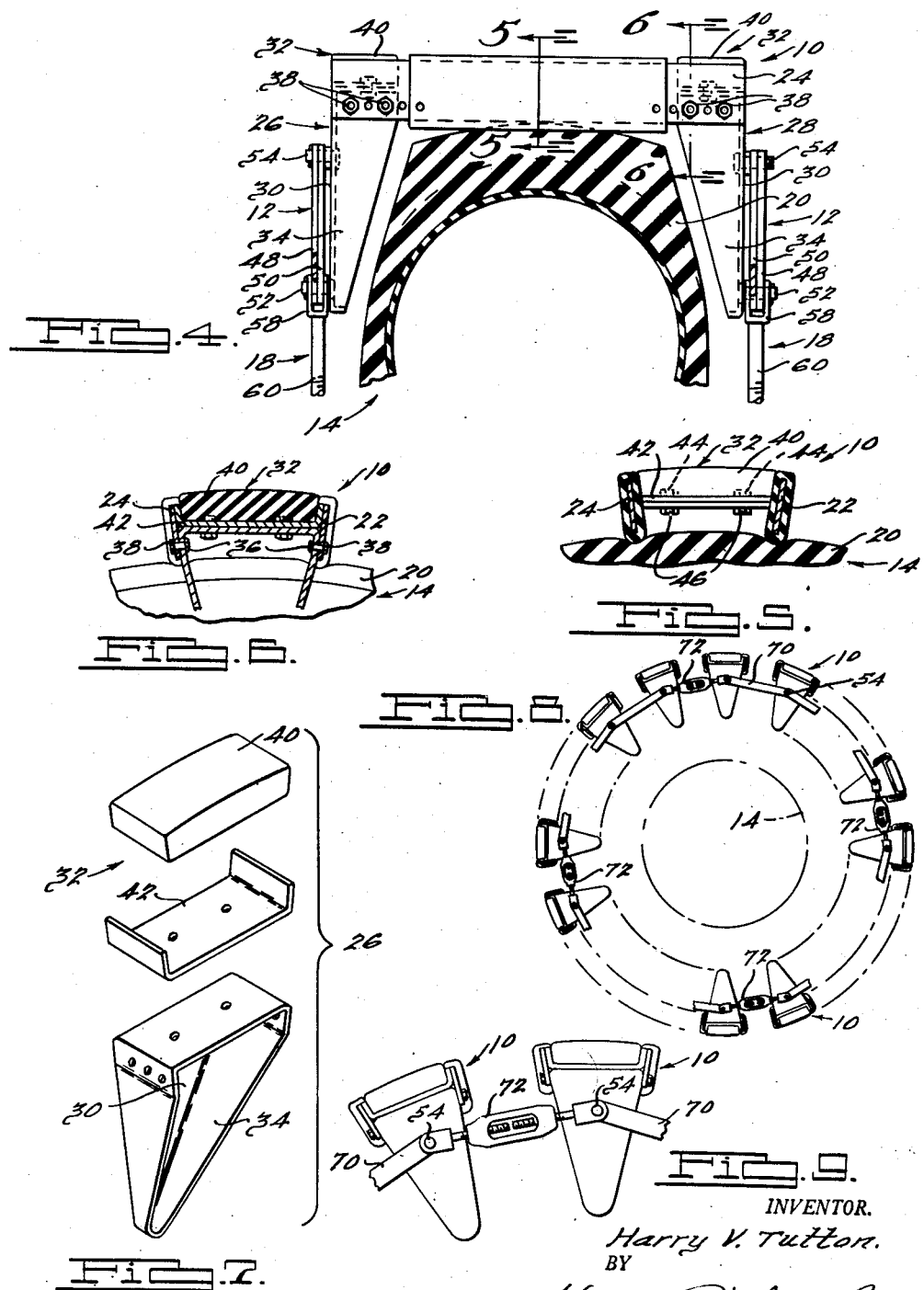

Nov. 9, 1954 — H. V. TUTTON — 2,693,839
VEHICLE WHEEL TRACTION DEVICE
Filed Nov. 19, 1948 — 3 Sheets-Sheet 3
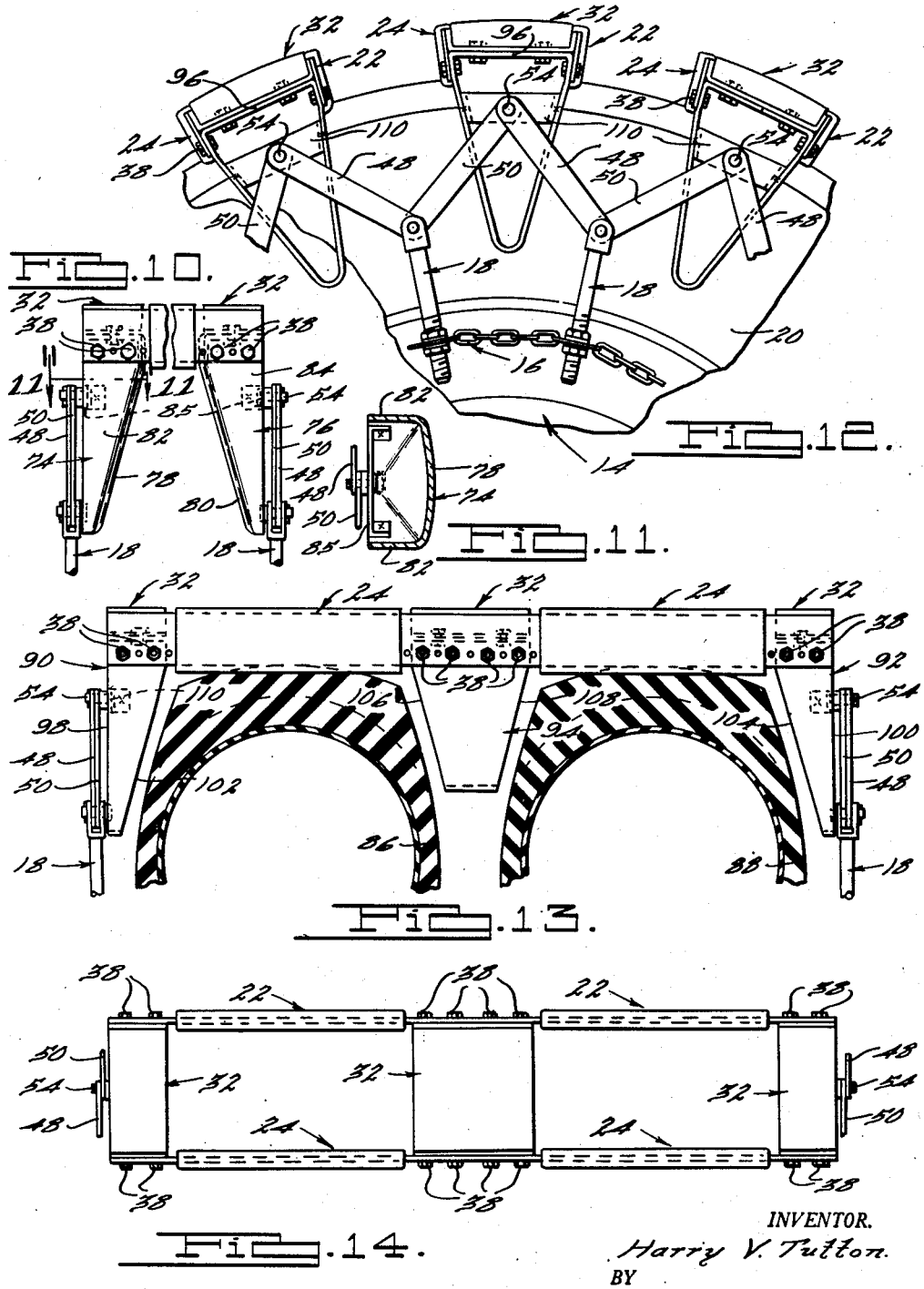
INVENTOR.
Harry V. Tutton.
BY
Harness, Dickey & Pierce
ATTORNEYS.

United States Patent Office 2,693,839
Patented Nov. 9, 1954

2,693,839

VEHICLE WHEEL TRACTION DEVICE

Harry V. Tutton, Detroit, Mich., assignor, by mesne assignments, to Sherman Products, Inc.

Application November 19, 1948, Serial No. 60,885

7 Claims. (Cl. 152—226)

This invention relates broadly to traction devices, and more particularly to a track which is adapted for application to the wheel of a vehicle to increase the traction characteristics thereof.

Every device which depends, at least to some extent, upon traction for efficiency presents a problem of maintaining traction under certain operating conditions. This problem is evident in the case of vehicles having ground-engaging wheels and is particularly pronounced in those vehicles which drive through a differential mechanism. Automobiles and farm tractors are typical examples of such vehicles. In these vehicles all of the driving wheels will spin without obtaining traction if these wheels are on equally slippery surfaces or one of the driving wheels will spin without obtaining traction whenever different traction surfaces are presented to the two driving wheels or whenever the traction surface does not offer sufficient resistance to the wheels to propel the vehicle. Thus, one or more driving wheels of an automobile is liable to spin without moving the vehicle if it is in mud or on ice. Another typical situation is frequently encountered by the farmer when plowing with a wheel tractor. When starting to plow an unbroken field, the farmer frequently must wait until the sod is dry, because the wheels slip and spin on the wet vegetation. Further, a difficult situation is presented even after plowing has begun. Under these circumstances the tractor is driven with one driving wheel in the furrow and the other driving wheel on unplowed ground beside the furrow. Thus one driving wheel of the tractor rests on freshly plowed earth and the other driving wheel rests on sod or vegetation of one kind or another. The latter surface is slippery when wet so that different traction surfaces are presented to the two driving wheels of the tractor. Plowing frequently cannot be accomplished successfully under these conditions, since the wheel which rides upon the unplowed surface will spin before any appreciable plowing can be accomplished. This deficiency of the wheel tractor is irritating to the farmer and wasteful of his time. Under these conditions the farmer simply has to wait until the sod is dry even though the ground may be in prime condition for plowing. Thus, this situation places the farmer entirely at the mercy of the elements and frequently is the cause of disastrous delays in plowing, cultivating or harvesting.

An important object of the present invention is to provide traction devices or tracks that can be readily applied to the driving wheels of any vehicle and that will materially increase the traction effort of such wheels.

Another object of the invention is to provide a track that is pre-eminently suited for increasing the traction effort of vehicles having multiple drives.

Another object of the invention is to provide tracks of the above-mentioned character that can be kept constantly on the wheels and used on all types of ground or road surfaces.

Still another object of the invention is to provide tracks of the above-mentioned character that materially enhance the riding qualities of vehicles such as tractors or the like.

Yet another object of the invention is to provide a track that will automatically clean itself and maintain itself relatively free of mud and debris.

A further object of the invention is to provide tracks of the above-mentioned character that are uniquely constructed to engage and grip the peripheral surfaces of the wheels on which they are mounted in a novel and efficient manner.

A still further object of the invention is to provide tracks of the above-mentioned character that can be easily and quickly applied to or removed from the wheels.

Other objects and advantages of the invention will be apparent during the course of the following description.

In the drawings forming a part of this specification and wherein like numerals are employed to designate like parts throughout the same:

Fig. 1 is a side-elevational view of a wheel equipped with a track embodying the present invention;

Fig. 2 is an enlarged, fragmentary, side-elevational view showing a portion of the wheel illustrated in Fig. 1;

Fig. 3 is a fragmentary, top-plan view of the track looking generally in the direction of the arrows 3—3 in Fig. 2;

Fig. 4 is a fragmentary, sectional view taken on the line 4—4 of Fig. 2;

Fig. 5 is a fragmentary, transverse sectional view taken on the line 5—5 of Fig. 4;

Fig. 6 is a fragmentary, transverse sectional view taken on the line 6—6 of Fig. 4;

Fig. 7 is an exploded perspective view of a cleat end member assembly;

Fig. 8 is a side-elevational view showing a modified track embodying the invention;

Fig. 9 is an enlarged view of a portion of Fig. 8.

Fig. 10 is a fragmentary side-elevational view showing a modified cleat construction;

Fig. 11 is a transverse sectional view taken on the line 11—11 of Fig. 10;

Fig. 12 is a fragmentary side-elevational view of a wheel and track and showing another modified cleat construction;

Fig. 13 is a fragmentary view showing a cleat embodying the present invention adapted for dual wheels of the type conventionally used for transport trailers and the like; and Fig. 14 is a top plan view of the cleat shown in Fig. 12.

The track shown in Figs. 1–7 comprises a plurality of cleats 10 which are fastened together in series relation by connecting members 12 at the ends of the cleats. The assembled cleats 10 form a complete circle or annulus and are adapted to extend entirely around the periphery of a wheel 14. Disposed radially inwardly from the cleats 10 on opposite sides of the wheel 14 are annular anchoring members 16, and the members 12 are connected to the anchoring members by fastening devices 18. The devices 18 are adjustable to hold the cleats 10 pressed solidly against the periphery of wheel 14, and the connecting members 12 are uniquely constructed to hold all of the cleats 10 pressed against the wheel under uniform pressure and to maintain the cleats automatically uniformly spaced on the wheel. Also, it is a feature of the invention that the connecting members 12 are fastened to the cleats in such manner as to prevent the cleats from being twisted in use so as to break the track.

The wheel 14 can be any type of wheel having an indentable, peripheral surface. Thus, any wheel having a rubber tire provides a suitable mounting for the track embodying the present invention. For the purpose of this disclosure the wheel 14 may be considered to be the wheel of a tractor having the usual rubber tire 20.

All of the cleats 10 are identical in construction and a detailed description of one therefore will suffice. Essentially, each cleat comprises a pair of inherently rigid, lateraly spaced, generally parallel side bars 22 and 24 having inner edge portions which engage the periphery of the tire 20 at circumferentially spaced points and extend transversely entirely across the peripheral surface of the tire. The outer edge portions of the side bars 22 and 24 engage the ground or other surface traversed by the wheel to provide traction for the wheel. If the wheel traveled constantly on a plane flat surface so that there was no tendency for the tire 20 to slide sideways on the cleats, the side bars 22 and 24 would be the only essential, tire-engaging and controlling elements of the cleats;

however, as a practical matter, vehicles of the type for which the track is primarily intended operate out of doors and on various slopes and surface conditions. Therefore, each cleat also is provided with a pair of end guide assemblies 26 and 28 which are arranged in embracing relation to the tire 20 to limit relative sideways or lateral movement of the track on the tire. Usually the end guide assemblies 26 and 28 are spaced laterally and substantially equidistantly from the opposite side walls of the tire 20 as perhaps best shown in Fig. 4. Preferably, the end guide assemblies 26 and 28 are spaced sufficiently from the side walls of the tire 20 so that the cleats can rock on the periphery of the tire without bringing the members into engagement with the tire. Whenever the tractor is traveling along the side of a hill, for example, the cleats are tilted or inclined slightly on the tire. Also, the cleats frequently are rocked on the tire by local irregularities in the ground surface. For example, a small rock, stick or hillock can lift one end of a cleat and cause it to tilt or rock on the face of the tire. Under these circumstances it is necessary to have end guide assemblies 26 and 28. The inner sides of the end guides assemblies 26 and 28, i. e., the sides which face the side walls of the tire 20, are flared away from the side bars 22 and 24 to accommodate the curvature of the tire and it is important that these surfaces be straight or rectilinear in order to obviate any tendency for the tire to ride up on the guide members in the event the cleats are moved laterally on the tire sufficiently to bring the guide assemblies into engagement with the tire. All parts of the cleat 10 conveniently can be made from sheet metal by conventional stamping and forming operations.

It is essential that the side bars 22 and 24 be rigid for their entire length so that they will not flex or bend under pressure from the fastening devices 18 and connecting members 12. This feature is important, since the cleats 10 must be pulled against the tire 20 with sufficient force to indent the side bars 22 and 24 into the face of the tire, as shown in Fig. 5. Further, the side bars 22 and 24 must be essentially strong and rigid so that they hold the end guide assemblies 26 and 28 away from the side walls of the tire 20. If the end guide assemblies 26 and 28 engage the side walls of the tire simultaneously so that the tire in effect is wedged between them, there is a tendency for the guide members to cut and tear the tire in operation. Manifestly, this contingency must be avoided at all times.

Any cleat construction which provides the above elements is satisfactory and within the scope of this invention. However, I have shown in the drawing, by way of illustration, a preferred cleat construction. In this construction the side bars 22 and 24 are formed from sheet metal or standard bar stock, and the end guide assemblies 26 and 28 are formed separately from sheet-metal stampings. Each end guide assembly has a lower, generally triangular guide 30 and an upper, preferably removable pad 32. Each guide 30 is formed entirely around its periphery with a right-angularly extending flange 34 which projects inwardly toward the tire when the cleat is mounted on the wheel. The side bars 24 and 26 are fastened to the flanges 34 by bolts 36 and nuts 38. Each pad 32 has a block 40 of hard rubber or the like which is molded or otherwise attached to a generally U-shaped backing plate 42. Bolts 44 and nuts 46 fasten the backing plate 42 to the upper portions of flanges 34.

In connection with the foregoing, it will be readily apparent that the nuts 46 are readily accessible from inside the end guides 30 to effect attachment or removal of the upper pads 32.

Side bars 22 and 24 project above the guides 30 and engage the upturned side flanges of the backing plates 42. Thus the side bars 22 and 24 protect the pads 32 from lateral blows or forces which otherwise might tend to loosen them on the guides 30.

Also, it will be observed that the sides of the guides 30 and the side flanges of the backing plates 42 co-operate to hold the side bars 22 and 24 in generally outwardly divergent or flared relation. This is important in keeping the cleats 10 free from mud and debris in use. As the cleat 10 travels around the wheel 14, the portion of the tire 20 disposed between the side bars 22 and 24 flexes or "breathes" and flexing of the tire in this manner pushes mud and other debris from between the side bars. Ths flexing or "breathing" of the tire 20 is particularly pronounced when the load on the cleat 10 changes, as when the cleat moves to a position under the wheel or when it moves out from under the wheel.

The blocks 40 project beyond the side flanges of the backing plates 42 and preferably at least slightly beyond the outer edges of side bars 22 and 24 so that the vehicle travels solely on the pads when on a concrete or other hard surface road. However, when the vehicle is traveling on the ground or other relatively soft medium, the pads 32 sink into the ground so that the outer edges of side bars 22 and 24 penetrate the ground surface and provide a purchase for the cleat. As the pads 32 wear, they can be progressively raised as required by inserting spacers between the backing plates 42 and the pads 32.

With reference to the connecting members 12, it will be observed that adjacent cleats 10 are fastened together by links 48 and 50. Two links 48 and 50 are provided between each pair of cleats 10. The two links 48 and 50 in each pair are fastened together at one end by a pivot 52 and the opposite ends thereof are fastened to respective cleats 10 by pivots 54. Since each cleat 10 is fastened to two adjacent cleats by pairs of connecting links 48 and 50, there are two links attached to each cleat. Thus when the track is mounted on the wheel 14, all of the cleats 10 are fastened together in annular series relation and at both ends thereof by a continuous series of links 48 and 50.

It is important that all of the links 48 and 50 be equal in length so that pull exerted thereon by the fastening devices 18 is transmitted equally to the cleats 10. By making all of the links 48 and 50 of equal length, all of the cleats 10 are held against the tire 20 under uniform pressure, and the cleats are automatically maintained in substantially equispaced relation. Actually there is little tendency for the cleats to creep either circumferentially or laterally on the tire 20, since they are held aaginst the tire with considerable force and are actually indented into the peripheral surface of the tire as shown in Fig. 5. However, it will be readily apparent that if any creepage should occur or if the cleats are not spaced exactly equally when the track is first applied to the tire 20, those linkages connecting the cleats which are farthest apart will be extended more than the others. Consequently, a greater force will be applied to these linkages tending to pull the cleats closer together. In actual practice, I have found that the present arrangement tends automatically to space or respace the cleats 10 equally on the tire 20 and to maintain the cleats in essentially equispaced relation. Manifestly, it is necessary to prevent the cleats from bunching on the tire 20 in order to maintain good riding qualities and to assure maximum traction effect.

Also, it is desirable to maintain the pivots 54 below or radially inwardly with respect to the periphery of the tire 20. Any fixed object which enters the spaces between adjacent cleats 10 during operation of the vehicle so as to engage the leading edge of a cleat has a tendency to rock or rotate the cleat on the tire 20. If this occurs, the track may bend, break, or be otherwise distorted. I have found that danger of breaking the track in this manner can be satisfactorily overcome by locating the pivots 54 below or radially inwardly with respect to the periphery of tire 20 in the manner specified.

Any suitable type of anchoring members 16 may be employed. Pivoted connecting links or bars and annular pieces of chain or steel strand cable are typical examples of suitable means. In the drawing, by way of illustration, I have shown the anchoring members 16 in the form of annular chains. The ends of the chains are fastened together by conventional clevis connections 56. As suggested, a separate anchoring member 16 is provided at each side of the wheel 14 and the pivots 52 at opposite ends of the cleats 10 are connected to respective chains by the adjustable fastening devices 18, as perhaps best shown in Fig. 2.

Also, any suitable type of fastening device 18 may be employed. The device here shown by way of illustration comprises a clevis 58 having a threaded shank 60. The clevis arms are disposed in embracing relation to the links 48 and 50 and are fastened to the links by the pivots 52. The shank 60 of each device extends through a respective link of chains 16, and the engaged links of the chains are clamped between washers 62 and 64 by nuts 66 and 68.

Any of the metal parts of the track on which ice might tend to form and impair the efficiency of the track preferably are coated with rubber. In the drawings I have shown the portions of side bars 22 and 24 which extend between the end guide members 26 and 28 to be coated or sheathed in this manner. This rubber coating "breathes" or flexes in use and keeps the bars free of ice and other obstructive material.

In use, the track is applied to the wheel 14 by disengaging several of the fastening devices 18 from the anchoring chain 16. When the fastening devices 18 are disassociated from the chain, the connecting links 48 and 50 can be extended sufficiently so that the track can be readily placed on the wheel 14. Preferably the vehicle is raised with the wheel entirely off the ground when the track is being applied or removed. The fastening devices 18 are then again secured to the anchoring members 16, and nuts 62 and 64 are adjusted to pull the cleats 10 against the periphery of the wheel with sufficient force to indent the side bars 22 and 24 into the tire 20.

Reference is now had to the form of the invention shown in Figs. 8 and 9 of the drawing. Specifically, the track here shown comprises a plurality of cleats 10 fastened together in series relation and in the form of an annulus by fixed and adjustable couplings 70 and 72 respectively. The cleats 10 preferably are identical to the ones hereinabove described in detail. All of the couplings 70 and 72 are pivoted to the end pivots 54 as shown. The fixed couplings 70 preferably are made from rigid bar stock so that they hold the cleats 10 properly spaced on the wheel. Any suitable type of coupling that will adjust the radial dimension of the track is suitable. Conventional turnbuckle connections are here shown. Also, any necessary or desirable member of the couplings may be made adjustable. The number of adjustable couplings in any particular instance depends upon several factors such as the size of the track, the number of cleats and the type of wheel for which the track is primarily adapted. I have here shown four adjustable couplings 72 spaced equidistantly in the track.

The track can be applied to a wheel 14 easily and quickly by disengaging one of the turnbuckle connections 72, wrapping the track around the periphery of the wheel and then again engaging or fastening the turnbuckle. The vehicle preferably is jacked up so that the wheels clear the ground when the tracks are applied thereto. However, this may not be necessary if ready access can be had to all parts of the wheel. Alternatively, the tracks can be laid flat on the ground in extended condition, the vehicle run onto the tracks, and the latter then wrapped around the wheels and fastened as indicated above.

Preferably, the adjustable connections 72 are tightened sufficiently to indent the inner edge portions of cleat side bars 22 and 24 into the periphery of the tire so as to prevent slippage between the tire and the track. Manifestly, the adjustment can be made easily and quickly and any necessary or desirable tension can be imposed on the track.

The cleat shown in Figs. 10 and 11 is identical to the cleat hereinabove described except for the end guides. In the latter form of the invention the end guides are identified by the numerals 74 and 76. Guides 74 and 76 are formed with the closed face portions 78 and 80 thereof at the inside and they are assembled in the cleat so that the flanges 82 and 84 extend away from the tire. Cross bars 85 are welded or otherwise fastened to the flanges 82 and 84 at the outer sides of the cleats to carry the pivots 54.

The latter construction has the advantage that mud picked up by the wheel 14 cannot become packed in the guides 74 and 76. Any mud or the like that accumulates between the end guides 74 and 76 and the adjacent side walls of the tire 20 will sooner or later be forced out due to the inclined positions of the faces 78 and 80 and to breathing or flexing of the tire in use. Thus the track will tend to keep itself clean on the sides of the wheel as well as at the periphery.

In addition to the above, the cleat construction shown in Figs. 10 and 11 obviates any possibility of the end guides 74 and 76 becoming wedged against and tearing the relatively weak and thin side walls of the tire 20.

The closed inner faces 78 and 80 present smooth, non-cutting surfaces to the tire 20; and while they may press against the tire in the event the cleat is shifted laterally on the tire, they will not dig into, tear or otherwise damage the side walls of the tires.

The inner closed faces 74 and 76 of the cleat may be either planar or curved; however, they preferably are curved transversely as shown in Fig. 11 so as to present convex surfaces to the tire 20. I have found that by curving the faces 78 and 80 as shown, there is less tendency for debris to accumulate between the guides 74 and 76 and the tire 20, damage to the tire by engagement thereof with the guides is substantially eliminated, and any tendency for the tire to climb the guides and bend, break or ride out of the track is effectively overcome. If the track is relatively loose on the tire 20 and guides are pressed laterally against the tire with sufficient force, there is a tendency for the tire to climb the guide members and damage or ride out of the track if the inner faces 78 and 80 are flat. However, when the guides 74 and 76 are formed as shown in Figs. 10 and 11, the tire is guided back into the track without damage either to the cleat or the tire whenever the tire tends to ride up on the guides.

In Figs. 12, 13, and 14 I have shown a modified cleat construction which is primarily adapted and pre-eminently suited for use on dual wheels 86 and 88 of the type conventionally used on transport trailers and the like. In this form of the invention, the cleats are relatively longer so that they span both wheels 86 and 88, as shown in Fig. 13. Each cleat has end guides 90 and 92 arranged in embracing relation to the wheels 86 and 88, and, in addition, is provided at substantially the middle thereof with a guide 94 which extends into the space between wheels. All three guides 90, 92, and 94 are surmounted by pad assemblies 32 of the type hereinabove described. The middle guides 94 serve primarily to center the track on the wheels 86 and 88, and these guides, together with their associated pad assemblies 32, strengthen and reinforce the relatively long side bar members 22 and 24. Manifestly, the middle pad assemblies 32 co-operate with the endmost pad assemblies 32 to support the vehicle when the latter is traveling on hard surface roads.

The instant cleat may be provided with guides of any suitable construction and either form of guide hereinabove specifically described would be satisfactory. However, I have here illustrated still another type of guide which I have found to be satisfactory. In this form of the invention, both sides or faces of the guides are open so that they can be formed quickly and inexpensively from strips of sheet metal or from conventional bar or rod stock. To form the guides, the strips are fashioned into a generally triangular shape, as shown in Fig. 12, and the ends of the strips preferably abut as at 96 in the base of the triangle. As shown in Fig. 13, the outer edges 98 and 100 of the end guides are arranged substantially at right angles to the side bars 22 and 24, and the inner edges 102 and 104 thereof are tapered toward the outer edges away from the side bars so as to accommodate the tires 86 and 88. The opposite edges 106 and 108 of the middle guide 94 are tapered away from the side bars 22 and 24 for obvious reasons. All three guides 90, 92, and 94 preferably are bolted to the side bars 22 and 24 and to the pad assemblies 32 in the same manner as the cleats hereinabove described.

The instant cleat also has the advantage of being self-cleaning at the sides of the wheels, since mud or other debris can be readily pushed through the guide members. In actual practice, flexing or breathing of the tires in use tends to dislodge mud or other debris which accumulates in the guides or between the guides and the tires.

The individual cleats may be fastened together either as shown in Fig. 1 or as shown in Fig. 5. By way of illustration, I have shown the cleats assembled in the same manner as in Fig. 1. When the end guides 90 and 92 are fashioned in the manner hereinabove described, however, cross bars 110 must be welded or otherwise fastened thereto, as shown in Fig. 12, to carry the pivots 54. Connecting links 48 and 50 are fastened to the pivots 54, and these links are fastened to anchoring members 16 by adjustable connections 18 of the type described in connection with the first form of the invention.

Having thus described the invention, I claim:

1. In combination, a wheel having a rubber tire thereon; a plurality of cleats disposed in generally equispaced relation around the periphery of said tire, each cleat having edges resting on the peripheral surface of said tire and said edges being spaced circumferentially on and extending transversely across said peripheral surface; connecting links between and fastened to adjacent cleats collectively connecting said cleats in series relation; annular anchoring means spaced radially inwardly from said connecting links; and adjustable means fastening said connecting links to said anchoring means and holding said cleats pressed against the tire with said edges indented in the peripheral surface of the tire.

2. In combination, a wheel having a resilient indentable peripheral surface; a plurality of cleats arranged in spaced relation entirely around the periphery of the wheel, each cleat having essentially rigid edges resting on the peripheral surface of the wheel and said edges being spaced circumferentially on and extending transversely across said peripheral surface, each cleat also provided with radially inwardly extending end portions disposed laterally of and spaced from opposite sides of the wheel and said end portions forming guides for limiting movement of the cleats transversely on the wheel; a pair of pivoted connecting links between each pair of adjacent cleats and each link pivoted to a respective one of said cleats; anchoring means disposed radially inwardly from said cleats; and adjustable means fastening said connecting links to said anchoring means and acting through said links to hold the cleats pressed against the wheel with said edges indented in said peripheral surface.

3. In a wheel track, a pair of cleats, each cleat having side bars arranged for edgewise engagement with the peripheral surface of a wheel and end guide members for limiting movement of the cleats transversely on the wheel; links pivoted to said end guide members and the links at corresponding ends of the cleats being pivotally connected to each other; anchoring means; and means fastening the pivotally connected ends of said links to said anchoring means, said fastening means being adjustable to move said cleats relative to said anchoring means.

4. A cleat comprising spaced side bars having inner wheel-engaging edges and outer ground-engaging edges, guide members fastened to and disposed between said side bars, said guide members located at the ends and at the middle of said side bars and projecting inwardly substantially beyond the inner edges of said side bars, and pad assemblies surmounting said guide projecting outwardly beyond the outer edges of said side bars so as to provide sole supports for the cleat on hard surfaces.

5. A cleat comprising spaced side bars having inner wheel-engaging edges and outer-engaging edges, guides in the form of V-shaped metal strips at the ends and fastened to said side bars, and pad assemblies surmounting said guides projecting outwardly beyond the outer edges of said side bars so as to provide sole supports for the cleat on hard surfaces.

6. A cleat comprising spaced side bars, and guides at the ends and fastened to said side bars projecting substantially at right angles and rigidly fixed with respect to the side bars, said guides being hollow and opening inwardly toward each other.

7. A cleat comprising spaced guides, pads surmounting and fastened to said guides, and side bars fastened to the sides of the guides, said side bars projecting upwardly from the guides and along the sides of the pads and the projecting portions thereof protecting the pads from lateral blows or thrusts which might tend to tear the pads from the guides.

References Cited in the file of this patent

UNITED STATES PATENTS

| Number | Name | Date |
|---|---|---|
| 1,045,533 | Echart | Nov. 26, 1912 |
| 1,287,512 | Swanson | Dec. 10, 1918 |
| 1,343,294 | Waite | June 15, 1920 |
| 1,846,335 | Hughes | Feb. 23, 1932 |
| 1,884,283 | Schneider | Oct. 25, 1932 |
| 2,347,416 | Kennedy | Apr. 25, 1944 |
| 2,352,174 | Barrows | June 27, 1944 |

FOREIGN PATENTS

| Number | Country | Date |
|---|---|---|
| 488,562 | Germany | Dec. 30, 1929 |